US006204620B1

(12) United States Patent
McGee et al.

(10) Patent No.: US 6,204,620 B1
(45) Date of Patent: Mar. 20, 2001

(54) METHOD OF CONTROLLING AN INTELLIGENT ASSIST DEVICE

(75) Inventors: Dean McGee, Rochester Hills; Peter Swanson, Lake Orion, both of MI (US)

(73) Assignee: Fanuc Robotics North America, Rochester Hills, MI (US)

( * ) Notice: Subject to any disclaimer, the term of this patent is extended or adjusted under 35 U.S.C. 154(b) by 0 days.

(21) Appl. No.: 09/458,294

(22) Filed: Dec. 10, 1999

(51) Int. Cl.$^7$ ...................................................... B25J 9/18
(52) U.S. Cl. ................................ 318/568.11; 318/568.21; 318/646; 254/1
(58) Field of Search .......................... 318/568.11, 568.21, 318/646; 254/1, 33, 45, 269

(56) References Cited

U.S. PATENT DOCUMENTS

| 3,904,042 | * | 9/1975 | Colston | 217/1 CM |
| 4,305,028 | | 12/1981 | Kostas et al. | 318/565 |
| 4,403,281 | | 9/1983 | Holmes | 364/170 |
| 4,486,843 | * | 12/1984 | Spongh et al. | 364/513 |
| 4,625,285 | | 11/1986 | Mori et al. | 364/513 |
| 4,694,230 | * | 9/1987 | Slocum et al. | 318/568 |
| 4,744,719 | | 5/1988 | Asano et al. | 414/730 |
| 5,130,632 | * | 7/1992 | Ezawa et al. | 318/568.11 |
| 5,442,269 | * | 8/1995 | Takayama et al. | 318/568.11 |
| 5,739,811 | * | 4/1998 | Rosenberg et al. | 345/161 |
| 5,834,917 | * | 11/1998 | Yasui et al. | 318/568.11 |
| 5,865,426 | | 2/1999 | Kazerooni | 254/270 |
| 5,880,956 | | 3/1999 | Graf | 364/191 |
| 6,104,158 | * | 8/2000 | Jacobus et al. | 318/568.11 |

* cited by examiner

Primary Examiner—Robert E. Nappi
Assistant Examiner—Rita Leykin
(74) Attorney, Agent, or Firm—Howard & Howard

(57) ABSTRACT

A method of controlling a powered manipulator (10) is disclosed. The powered manipulator (10) includes at least one motor (12), at least one force sensor (14) on a manual control handle (16) and a microprocessor (18) combined with the plurality of the force sensors (14) for controlling a powered manipulator (10) within physical limits of a workspace. The method comprises the steps of the operator imparting a force on the control handle (16), sensing the direction and magnitude of the force with the plurality of force sensors (14) and sending the force data to the microprocessor (18), processing the force data from the plurality of force sensors (14) with the microprocessor (18) to create movement commands for the powered manipulator (10) and moving the powered manipulator (10) in response to the movement commands from the microprocessor (18). An adaptive gain feature proportions powered manipulator movement commands relative to force imparted by an operator on the control handle (16) and can be relative to dynamic motion states. The microprocessor (18) is programmed for establishing virtual constraints to limit the movement of the powered manipulator (10) within a virtual workspace thereby preventing the operator from moving the powered manipulator (10) to at least some of the mechanical limits. Modifying the powered manipulator movement commands in relation to the virtual constraints assists the operator in guiding the powered manipulator (10) to a specific point within the virtual workspace.

26 Claims, 4 Drawing Sheets

METHOD OF CONTROLLING AN INTELLIGENT ASSIST DEVICE

BACKGROUND OF THE INVENTION

1. Field of the Invention

The subject invention relates to the method of controlling a powered manipulator within a workspace by operator inputs.

2. Description of the Prior Art

The moving of heavy objects from one location to another traditionally is accomplished by the use of a powered manipulator or more typically, an unpowered manipulator that utilizes overhead rails or a bridge gantry with a carriage movably supported thereon. An arm is pivotally attached to the carriage to lift the objects from overhead. When moving a heavy object, it is desirable to have the operator as close to the object as possible to make movement of the object more intuitive as if the operator was actually lifting and moving the object. To this end, it is desirable to utilize power assisted manual manipulators.

Methods to control a power assisted manual manipulator must provide adequate operator safety and still provide an intuitive human interface. One method of controlling an assist device is comprises the steps of utilizing an actuator to sense the required force for lifting a load, providing an end-effector to interface between a human operator and the load, engaging the load with the end effector, detecting a magnitude of human force imparted by the operator on the end-effector as the operator lifts the load and using the magnitude of the human force to regulate the actuator and cause the actuator to lift the load. This method utilizes the imparted force by the operator to govern the force provided to assist in lifting the load. In this way an operator maintains the feel of lifting the load and moving it but exerts only enough force to control the moving of the load.

Another method of moving a load is exemplified by a power assist device used by an operator to pick up an instrument panel off a rack and guide the instrument panel into a vehicle cabin for attachment therein. The operator does not support the weight of the instrument panel and is free to move the instrument panel around the workspace without constraint. The deficiency in this method is that there is no restraint on powered manipulator motion. As a result, the power assist device can be freely wielded by the operator, and the operator may inadvertently move the instrument panel into anything, damaging both the instrument panel and whatever the panel hits.

SUMMARY OF THE INVENTION AND ADVANTAGES

A method of controlling a powered manipulator having at least one motor is disclosed. The powered manipulator utilized in the method includes a plurality of force sensors on a manual control handle combined with a microprocessor for controlling the powered manipulator within mechanical limits of the powered manipulator is disclosed. The method includes the steps of imparting a force on the control handle, sensing the direction and magnitude of the force with the plurality of force sensors and sending the force data to the microprocessor, processing the force data from the plurality of force sensors with the microprocessor to create movement commands for the powered manipulator, and moving the powered manipulator in response to the movement commands from the microprocessor. The method is characterized by programming the microprocessor for establishing virtual constraints to limit the movement of the powered manipulator within a virtual workspace.

Accordingly, the established virtual constraints allow freedom of movement of the powered manipulator without the risk of the powered manipulator bumping into objects within the work area when moving a workpiece. Additionally, the virtual constraints assist the operator in guiding the powered manipulator to a specific position by gradually diminishing the area in which the powered manipulator can be moved. As appreciated, this method accomplishes controlled movement of a load without sacrificing operator safety. Further, the evident advantages associated with an intuitive human interface are maintained.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
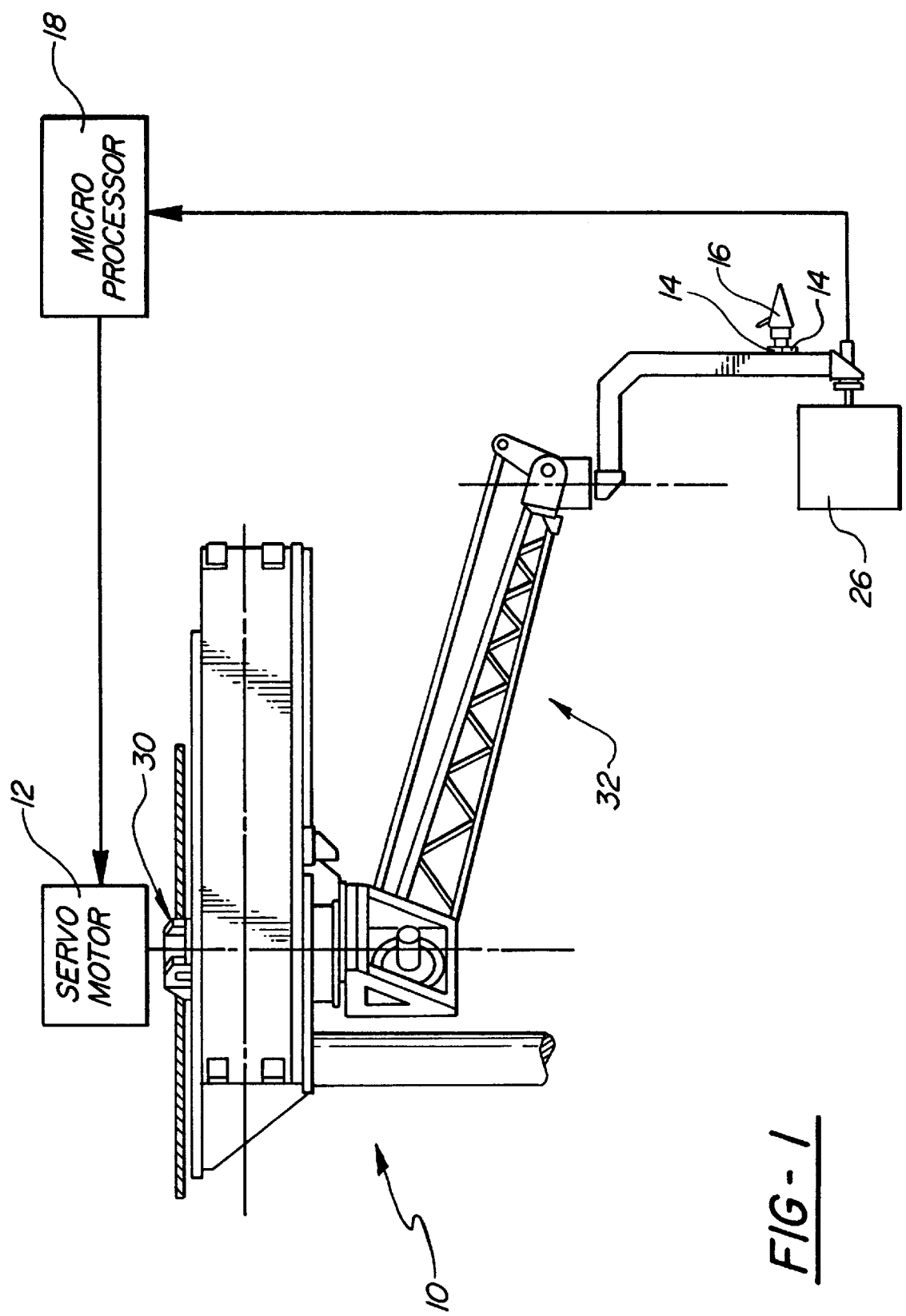
FIG. 1 is a perspective view of an intelligent assist device.

Referring to the Figures, wherein like numerals indicate like or corresponding parts throughout the several views, a method of controlling a powered manipulator 10 is disclosed. Referring primarily to FIG. 1, the powered manipulator 10 includes at least one motor 12, a plurality of force sensors 14 on a manual control handle 16 combined with a microprocessor 18 for controlling a powered manipulator 10 within mechanical limits of the powered manipulator 10. The specific type of powered manipulator 10 referred to is an intelligent assist device (IAD). Referring to FIG. 1, the IAD 10 comprises a movable base 30 supporting a lift mechanism 32 for moving a workpiece 26. The IAD also includes at least one servomotor 12 for actuating the lift mechanism 32 and moving the workpiece 26. For descriptive purpose only the subject method invention will be described below in terms of one servomotor 12. The lift mechanism 32 supports an operator control handle 16 that receives inputs from an operator. A plurality of force sensors 14 are disposed between the operator control handle 16 and the lift mechanism 32 for sensing the operator inputs and actuating at least one servomotor 12.

Figure 6:
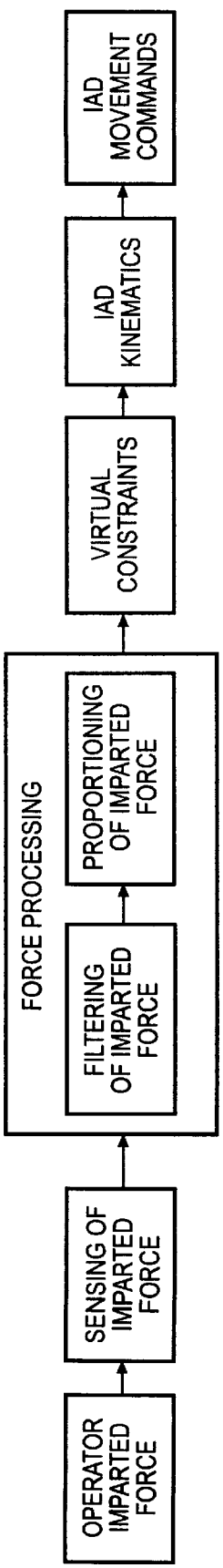
FIG. 6 is a flow diagram of a method for controlling the intelligent assist device.

Referring to FIG. 6, the method comprises the steps of the operator imparting a force on the control handle 16, sensing the direction and magnitude of the force with the plurality of force sensors 14 and sending the force data to the microprocessor 18, processing the force data from the plurality of force sensors 14 with the microprocessor 18 to create movement commands, and moving the IAD 10 in response to the movement commands from the microprocessor 18. Referring back to, the processing step includes filtering of some portion of the imparted force on the control handle 16. Filtering accomplishes a smoothing of movement of the IAD 10 by eliminating natural vibrations and sudden inconsistent motions by the operator from becoming incorporated into the movement commands. More specifically filtering prevents specific operator inputs from being translated into IAD movement commands thereby preventing undesirable jerking or oscillation of the IAD 10.

An adaptive gain feature that proportions IAD 10 movement commands relative to the operator imparted force on the control handle 16 is included in the processing step. In other words, a specific magnitude of operator imparted force on the control handle 16 is translated proportionally into IAD 10 movement commands. The proportion of the operator imparted force to the IAD 10 movement commands can be varied as is desired in relation to a position within a virtual workspace, automatic selection triggered by a specific event or dependent on a manual selection by the operator. In addition, the proportion may be varied in relation to the speed of the powered manipulator (10) or. Further, proportioning allows changing the way controlling the IAD 10 feels to the operator. The proportion can be adjusted such that a small amount of force by the operator results in large and fast movements of the IAD 10 or adjusted such that a large amount of force is required to make small moves. The proportion can be dependent on dynamic motion states such as speed, velocity, acceleration, or the like. It should be appreciated that this allows for fine motion control at low speeds and better control of the powered manipulator 10 at higher speeds. The proportion can also be varied with settings for operator skill, tasks to be performed, interaction with virtual constraints, regions in the workspace, sensor input, or other criteria. The proportion changes smoothly over time to allow the operator to adjust to the new feel and prevent jerky motion. Additionally, adjusting the feel of the IAD 10 allows for a more intuitive control of the IAD 10.

Figure 5:
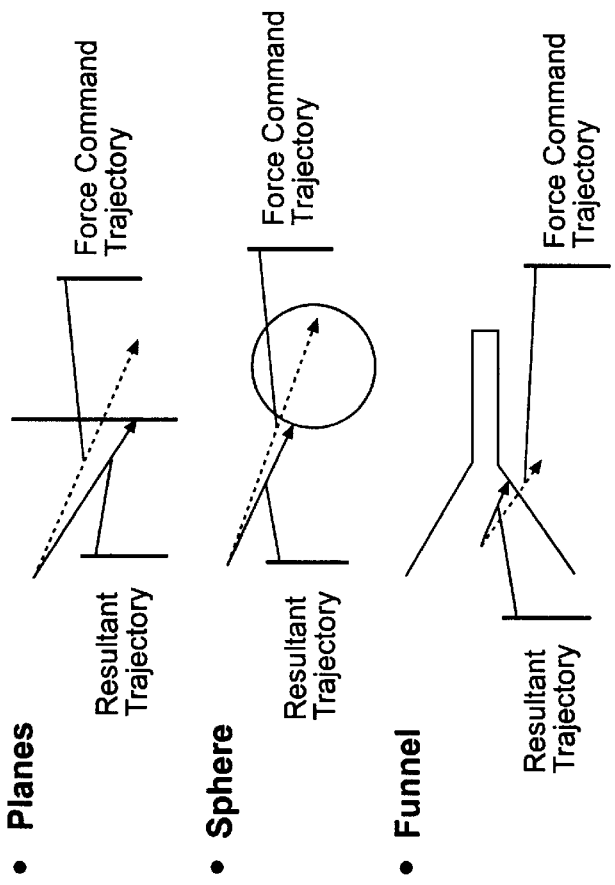
FIG. 5 is a drawing contrasting the actual trajectory of the intelligent assist device with a resultant trajectory for specific geometric shapes of virtual constraints.

The method is characterized by programming the microprocessor 18 for establishing virtual constraints to limit movement of the IAD 10 within the virtual workspace to prevent an operator from moving the powered manipulator (10) to at least some of the physical limits of a workspace. Operator imparted movement of the IAD 10 is prevented by modifying the movement commands in the microprocessor 18 in response to the relationship between the IAD position and the established virtual constraints. The modification of the movement commands by the microprocessor 18 is accomplished by determining a predicted trajectory of the IAD 10 according to the operator imparted force on the control handle 16. Referring to FIG. 5, the predicted trajectory of the IAD is illustrated with the dashed line arrow. Further shown in FIG. 5, are predicted trajectories in relation to specific geometrically shaped virtual constraints. As appreciated this is the trajectory or path that the IAD 10 would travel in the absence of the established virtual constraints. The predicted trajectory is compared to the position of the established virtual constraints and the movement commands are modified to provide a resultant trajectory, shown a solid lined arrows in FIG. 5, in which the IAD 10 will actually move. The process of modifying the IAD 10 trajectory occurs continuously as the IAD 10 is moved within the virtual workspace.

Modification of the IAD movement commands allows the virtual constraints to assist an operator in guiding the IAD 10 to a specific point. The virtual constraints can be constructed to contain a decreasing cross-sectional area, wherein the area within the virtual constraints is progressively decreased to terminate at a specific point. Virtual constraints coupled with the modification of the movement commands in relation to the virtual constraints assists the operator in guiding the IAD 10 to, or near, the specific point.

Figure 2:
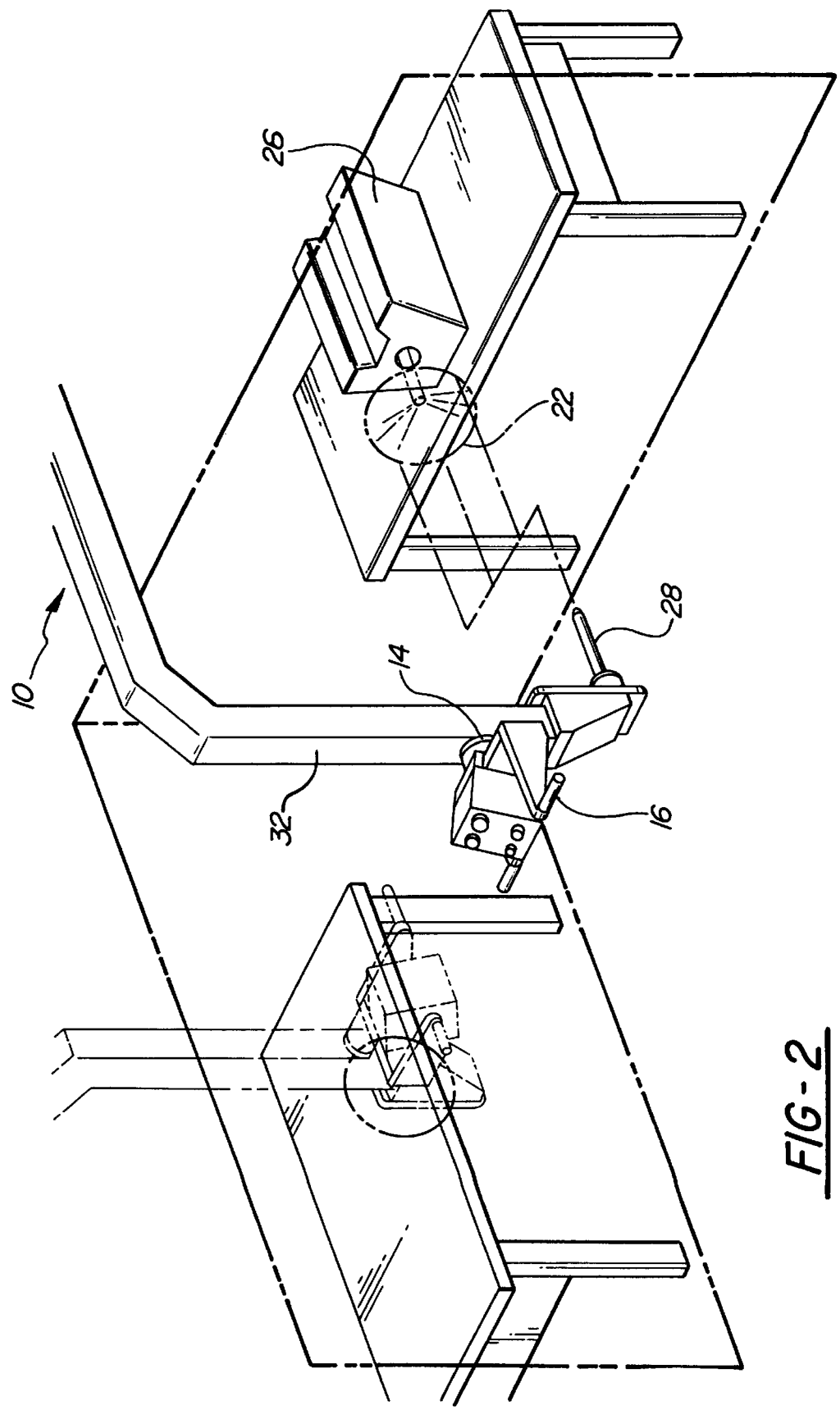
FIG. 2 is a perspective view of a the intelligent assist device within a work area including virtual walls and funnels.
Figure 3:
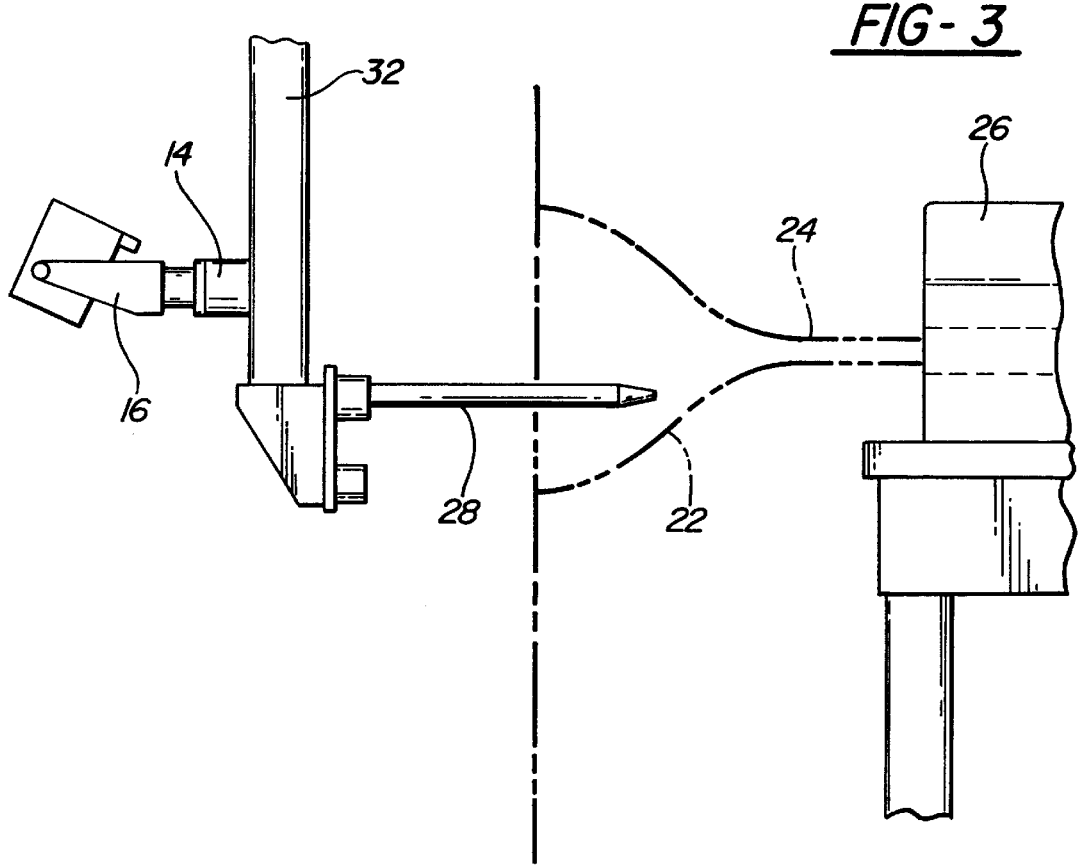
FIG. 3 is a sectional view of the intelligent assist device moving with a funnel shaped virtual constraint.

The virtual constraints can be established as a two-dimensional shape or as a three-dimensional shape. As shown in FIG. 2, a two dimensional shape, such as a virtual wall can be constructed to define outer limits of the virtual workspace. Further, a two-dimensional shape can be placed around known obstacles within the workspace to prevent collisions. The three dimensional shape of the virtual constraint can be constructed to form any desired shape. For example, as shown in FIG. 3, a funnel shaped virtual constraint 22 is used to guide the IAD 10 to the specific point. As is shown, the three-dimensional shape forms a funnel shape at a first end and a tunnel shape at a terminal end. The funnel shaped virtual constraint 22 leads into a tunnel shaped virtual constraint 24 that extends into the workpiece 26. The tunnel shaped virtual constraint 24 defines tolerance limits in which the IAD 10 is allowed to move. FIG. 3 illustrates how the shape of the virtual constraint can be customized dependant on specific application requirements and a unique workpiece 26. The IAD 10 has an end of arm tool 28 tailored to fit the workpiece 26 and is guided into the workpiece 26 by the funnel shaped virtual constraint 22 leading into the tunnel shaped virtual constraint 24.

Figure 4:
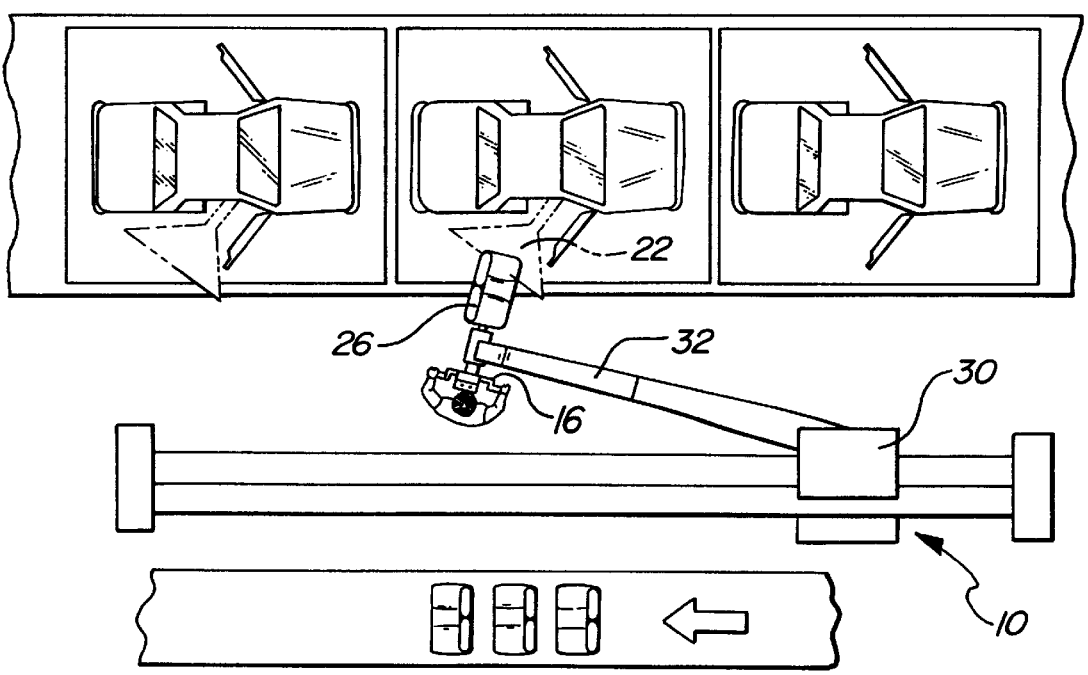
FIG. 4 is an overhead view of an assembly line and the use of the intelligent assist device with tracking virtual constraints.

Further geometric shapes useful in guiding the IAD 10 within the workspace includes the use of a tunnel with a first end opening at a first specified point and a second end opening at a second specified point to establish a path. A tunnel shaped path allows the establishment of an efficient path in which the operator can move the workpiece 26 while maintaining intuitive control over movement of the IAD 10. Additionally, a sphere shaped constraint can be used when it is desired to control IAD 10 characteristics, such as speed and adaptive gain dependant on the position within the virtual workspace. This allows the establishment of areas within the workspace where characteristics of the IAD 10 are controlled according to a specific task. The tunnel shaped path may also include at least one intermediary point which establishes a curved path from the first specified point through the intermediary point(s) to the second specified point Referring to FIG. 4, the method further provides for tracking a specific moving point and moving the established virtual constraints relative to the specific moving point. Also, the established virtual constraints may by positioning at various locations within the virtual workspace The ability to track a moving point allows for increased application flexibility in the use of virtual constraints. FIG. 4 illustrates how tracking the virtual constraints may be used on a moving assembly line in which a workpiece 26 is to be assembled into a vehicle cab. The workpiece 26 is picked up from a storage area 34 and moved by the operator toward the vehicle. The movement of the vehicle along the assembly line is sensed by a remote sensor, or a sensor attached to the IAD, of any kind known in the art, and relayed to the microprocessor 18. A virtual constraint is established in relation to a final assembly point within the vehicle. The virtual constraint decreases the free movement available to the operator as the IAD 10 is moved closer to the vehicle. The operator then moves the workpiece 26 inside the vehicle cab to the final assembly point. At the final assembly point the virtual constraint limits movement of the IAD 10, and thereby the workpiece 26, to the tolerance limits required to assemble the workpiece 26 to the vehicle. Throughout this process the IAD 10 is tracking the vehicle and moving the virtual constraints relative to the specific final assembly point. This relieves the operator of the burden of tracking the assembly line, allowing the operator to devote full attention to assembling the workpiece 26 to the vehicle. Further, by limiting movement of the IAD 10, the virtual constraints ensure that the workpiece 26 does not inadvertently hit the vehicle.

The method also includes the use of virtual constraints to control how the IAD 10 moves, not just where it can move. Control of how the IAD 10 moves include varying a speed limit and resultant trajectory in relation to the IAD 10 position within the established virtual constraints. This capability allows the reduction of speed as the IAD 10 approaches the established virtual constraints to eliminate abrupt stops, and allows for the virtual constraints to have a virtual friction much like sliding friction in a physical environment. This capability is desirable to provide for operator safety and for the intuitive guiding of the IAD 10. As appreciated, when the operator feels the IAD 10 speed slowing and feels friction without a corresponding reduction in the imparted force, it will be understood that a virtual constraint is being approached and the operator will be able to change the direction of the IAD 10 to avoid the virtual constraint.

Further, it is desirable to limit speed of the IAD 10 in the interest of operator safety and efficiency. It may be desirable to limit the speed of the IAD 10 when the workpiece 26 is being carried to prevent the workpiece 26 from falling off and becoming damaged. Alternatively, it may be desirable to limit the speed of the IAD 10 to prevent the workpiece 26 from creating undesirable inertial forces that would hinder control of the IAD 10 and endanger the operator.

Operator safety during control of the IAD 10 when at an established virtual constraint is of concern. The concern is created by the magnitude of the operator imparted force being directly converted to motion along the surface of the virtual constraint, causing the IAD 10 to move in a different direction than the operator intended. This may be caused by the modification of the IAD 10 movement commands in relation to the virtual constraint. As described above the predicted trajectory of movement is substituted with a modified movement command defined to move the IAD 10 away or along the virtual constraints. Standard movement commands for the IAD 10 at a virtual constraint would be modified to move the IAD 10 in a different direction than the force being imparted on the control handle 16 by the operator. The force imparted by the operator in moving the IAD 10 against a virtual wall would be modified to a movement command that would move the IAD 10 laterally along the virtual constraint. To remedy this concern, a speed limit of zero is introduced along the virtual constraint which requires an operator to back the IAD 10 off the virtual wall before proceeding. Alternatively, the limit of the IAD 10 speed along the virtual constraint may also be set at a very slow rate to allow the IAD 10 to move along the virtual wall at a slow speed, thereby enabling the operator to control the IAD 10.

The method further provides for the establishment of multiple sets of dynamic virtual constraints that may be activated on a real-time basis by selecting a specific set of virtual constraints either manually or automatically. Real-time selected virtual constraints contrast static virtual constraints that are always present in the work area. Dynamically activated virtual constraints allow the operator to engage a specific virtual constraint dependant on the task to be performed.

In operation, the real-time dynamic virtual constraints allow the operator to engage a set of virtual constraints that are specific to the task being performed. The selection of the specific set of virtual constraints can be accomplished by an operator manually activating a switch present on the control handle 16 to engage a set of virtual constraints for guiding the IAD 10 in picking up a workpiece 26. The switch is then deactivated to disengage the virtual constraints and allow the operator free movement within the workspace. Further, it also conceived to be within this method to engage a specific set of virtual constraints with a sensor or a physically actuated switch, or logically when specific conditions are met, that is automatically activated on a real time basis when an operator approaches a workpiece 26 with the IAD 10.

In addition to constructing a set of virtual restraints that restricts the movement of the IAD 10 within its physical limits the method further provides for establishment of a virtual coordinate system to reposition forces in order to establish a preferred center of rotation in which the IAD 10 is moved in response to operator inputs. Additionally, establishment of a virtual coordinate system allows the positioning the coordinate system anywhere relative to the IAD 10. Further, the position of the coordinate system may be varied. This capability allows positioning of the coordinate system to provide for a more intuitive movement of the workpiece 26. When a workpiece 26 is not being moved the coordinate system can be placed on the IAD 10. When a workpiece 26 is being moved the coordinate system may be positioned on the workpiece 26 being moved by the IAD 10. This allows movement commands to be interpreted in relation to the coordinate system centered on the workpiece 26. Thereby when the operator rotates the IAD 10, the center point of that rotation can be placed on the center point of the workpiece 26, thus eliminating inertia created by moving a workpiece 26 extended a distance from the center of rotation. Further, once the IAD 10 is unloaded, the coordinate system can be centered back onto the IAD 10, restoring the intuitive control of the IAD 10.

The method also provides for limiting the available torque available from the motor 12 to prevent IAD movements from overpowering the operator or to limit potential collision damage to the IAD or objects in the workspace. In other words, the motor torque available to the IAD 10 is limited below the physical limitations of the motor 12, to provide for operator safety so IAD 10 movements do not exceed the physical limits of the operator. Also, undue contact forces exerted by the powered manipulator (10) during collisions are prevented by limiting available torque from the motor (12). Further, the motor 12 is utilized as a collision detection device that will sense a motor torque reading above a specified limit to signal the microprocessor 18 to disable IAD motion to prevent operator injury.

This application covers a method which may be performed by the apparatus in co-pending U.S. patent application entitled "Intelligent Power Assisted Manual Manipulator", Ser. No. 09/458,295 filed concurrently herewith and commonly owned by the assignee of the subject invention. (Attorney docket # 65,017-116).

The invention has been described in an illustrative manner, and it is to be understood that the terminology which has been used is intended to be in the nature of words of description rather than of limitation.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty has utility. In addition, the reference numerals are merely for convenience and are not to be in any way to be read as limiting.

What is claimed is:

1. A method of controlling a powered manipulator (10) having at least one motor (12), at least one force sensor (14) on a manual control handle (16) combined with a microprocessor (18) for controlling the powered manipulator (10) within mechanical limits of the powered manipulator (10), said method comprising the steps of:

imparting a force on the control handle (16);

sensing the direction and magnitude of the force with the force sensor (14) and sending force data to the microprocessor (18);

processing the force data from the force sensor (14) with the microprocessor (18) to create movement commands for the powered manipulator (10);

moving said powered manipulator (10) in response to the movement commands from the microprocessor (18);

said method characterized by programming the microprocessor (18) for establishing virtual constraints to limit the movement of the powered manipulator (10) within a virtual workspace to prevent an operator from moving the powered manipulator (10) to at least some of the physical limits of a workspace.

2. A method as set forth in claim 1 further characterized by modifying said movement commands in the microprocessor (18) in response to the relationship between a position of the powered manipulator (10) and the established virtual constraints.

3. A method as set forth in claim 1 further characterized by decreasing a cross-sectional area of the established virtual constraints, whereby the area within the virtual constraints are progressively decreased until a specific point within the virtual workspace is reached thereby assisting the operator in guiding the powered manipulator (10).

4. A method as set forth in claim 2 wherein the established virtual constraints are further defined by tracking a specific moving point and moving the established virtual constraints relative to the specific moving point.

5. A method as set forth in claim 2 wherein the established virtual constraints are further defined by positioning at various locations within the virtual workspace.

6. A method as set forth in claim 2 wherein modifying of the movement command is further defined by reducing speed of the powered manipulator (10) as it approaches the established virtual constraints to eliminate abrupt stops of the powered manipulator (10).

7. A method as set forth in claim 2 wherein modifying of the movement commands is further defined by varying the limit speed of the powered manipulator (10) in relation to the position of the powered manipulator (10) within the established virtual constraints.

8. A method as set forth in claim 6 wherein varying the limit of the speed of the powered manipulator (10) speed is further defined by reducing the speed of the powered manipulator (10) to zero when at the established virtual constraints, whereby the powered manipulator (10) is prevented from moving laterally.

9. A method as set forth in claim 3 wherein the established virtual constraints are further defined as forming a three-dimensional shape.

10. A method as set forth in claim 9 wherein forming the three-dimensional shape is further defined by forming a funnel shape at a first end and a tunnel shape at a terminal end.

11. A method as set forth in claim 9 wherein forming the three-dimensional shape is further defined by forming a sphere.

12. A method as set forth in claim 9 wherein forming the three-dimensional shape is further defined by forming a tunnel with a first end opening at a first specified point and a second end opening at a second specified point to establish a path.

13. A method as set forth in claim 12 wherein forming the three-dimensional shape is further defined by including at least one intermediary point which establishes a curved path from the first specified point through the intermediary point (s) to the second specified point.

14. A method as set forth in claim 1 further characterized by establishing multiple sets of virtual constraints for the virtual workspace and selecting a specific set of virtual constraints either manually or automatically.

15. A method as set forth in claim 1 further characterized by establishing a coordinate system and moving the powered manipulator (10) relative to the coordinate system in response to imparted force on the control handle (16).

16. A method as set forth in claim 15 wherein establishing the coordinate system is further defined by positioning the coordinate system on the powered manipulator (10) and varying a position of the coordinate system in relation to the powered manipulator (10).

17. A method as set forth in claim 1 further characterized by filtering out some portion of the imparted force on the control handle (16) to smooth movement of the powered manipulator (10) and prevent undesirable oscillation of the powered manipulator (10), whereby natural vibrations and sudden inconsistent motions by the operator are not translated into powered manipulator movement commands.

18. A method as set forth in claim 1 further characterized by limiting available torque from the motor (12) to prevent movement of the powered manipulator (10) from overpowering the operator.

19. A method as set forth in claim 1 further characterized by limiting available torque from the motor (12) to prevent movement of the powered manipulator (10) from exerting undue contact forces during collisions.

20. A method as set forth in claim 1 further characterized by disabling powered manipulator motion to prevent operator injury by sensing the motor (12) torque, whereby a motor (12) torque reading above a specified limit will initiate shutdown of the powered manipulator (10).

21. A method as set forth in claim 2 further characterized by proportioning the powered manipulator movement commands relative to the imparted force on the control handle (16).

22. A method as set forth in claim 21 wherein proportioning the powered manipulator movement commands is further defined by varying the proportion of the powered manipulator movement commands relative to the imparted force on the control handle (16) in relation to the position of the powered manipulator (10) within the virtual workspace.

23. A method as set forth in claim 21 wherein proportioning the powered manipulator movement commands is further defined by varying the proportion of the powered manipulator movement commands relative to the imparted force on the control handle (16) in relation to the speed of the powered manipulator (10).

24. A method as set forth in claim 21 wherein proportioning the powered manipulator movement commands is further defined by varying the proportion of the powered manipulator movement commands relative to the imparted force on the control handle (16) dependent on a manual selection by the operator.

25. A method as set forth in claim 21 wherein proportioning the powered manipulator movement commands is further defined by transitioning the proportion of the powered manipulator movement relative to the imparted force on the control handle (16) commands smoothly over a time period.

26. A method as set forth in claim 21 wherein proportioning the powered manipulator movement commands is further defined by varying the proportion of the powered manipulator movement commands relative to the imparted force on the control handle (16) dependent on automatic selection.

* * * * *